US008259356B2

(12) United States Patent  (10) Patent No.: US 8,259,356 B2
Ohkawa  (45) Date of Patent: Sep. 4, 2012

(54) APPARATUS AND METHOD OF IMAGE PROCESSING FOR SELECTIVE COLOR DETERMINATION

(75) Inventor: Satoshi Ohkawa, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 797 days.

(21) Appl. No.: 12/432,912

(22) Filed: Apr. 30, 2009

(65) Prior Publication Data

US 2009/0273814 A1    Nov. 5, 2009

(30) Foreign Application Priority Data

May 1, 2008    (JP) .................................. 2008-119963

(51) Int. Cl.
G06K 15/00    (2006.01)
G06K 9/00    (2006.01)
G06F 15/00    (2006.01)
(52) U.S. Cl. ........................ 358/2.1; 358/1.9; 382/162
(58) Field of Classification Search .................... None
See application file for complete search history.

(56) References Cited

U.S. PATENT DOCUMENTS

| 5,313,312 | A | 5/1994 | Yamada | |
|---|---|---|---|---|
| 6,519,360 | B1 * | 2/2003 | Tanaka | 382/162 |
| 7,417,770 | B2 * | 8/2008 | Fukao | 358/2.1 |
| 7,911,649 | B2 * | 3/2011 | Imine | 358/2.1 |
| 2004/0223188 | A1 * | 11/2004 | Toda | 358/2.1 |
| 2005/0168764 | A1 * | 8/2005 | Yamamura | 358/1.13 |
| 2006/0067575 | A1 | 3/2006 | Yamada | |
| 2006/0187246 | A1 | 8/2006 | Miyagi | |
| 2007/0086068 | A1 | 4/2007 | Ohkawa et al. | |
| 2007/0242297 | A1 | 10/2007 | Eki | |
| 2008/0008388 | A1 | 1/2008 | Ohkawa et al. | |
| 2008/0117468 | A1 | 5/2008 | Ohkawa | |
| 2008/0239347 | A1 * | 10/2008 | Minamino et al. | 358/1.9 |

FOREIGN PATENT DOCUMENTS

| EP | 1 148 711 A1 | 10/2001 |
|---|---|---|
| EP | 1 359 537 A2 | 11/2003 |
| EP | 1 703 714 A1 | 9/2006 |

(Continued)

OTHER PUBLICATIONS

Office Action issued Jan. 10, 2012 in Japanese Application No. 2008-119963.

Primary Examiner — Twyler Haskins
Assistant Examiner — Barbara Reinier
(74) Attorney, Agent, or Firm — Oblon, Spivak, McClelland, Maier & Neustadt, L.L.P.

(57) ABSTRACT

An image processing apparatus includes a first color determining device, a storage device, a second color determining device, an output image processing device, and a controller. The controller compares between a first area of input image data and a second area of the input image data to generate a comparison result. When the comparison result indicates that the second area of the input image data does not match the first area of the input image data, the controller causes the second color determining device to generate the second determination result and causes the output image data to be generated based on the second determination result. When the comparison result indicates that the second area of the input image data matches the first area of the input image data, the controller causes the output image processing device to apply image processing determined based on the first determination result.

14 Claims, 7 Drawing Sheets

FOREIGN PATENT DOCUMENTS

| | | |
|---|---|---|
| JP | 3-64267 | 3/1991 |
| JP | 6-14205 | 1/1994 |
| JP | 6-225167 | 8/1994 |
| JP | 2001-103324 | 4/2001 |
| JP | 2001-268379 | 9/2001 |
| JP | 2004-112725 | 4/2004 |
| JP | 3713352 | 8/2005 |
| JP | 3772610 | 2/2006 |
| JP | 2006-86629 | 3/2006 |
| JP | 2006-237856 | 9/2006 |
| JP | 2007-28408 | 2/2007 |
| JP | 2007-116272 | 5/2007 |

* cited by examiner

APPARATUS AND METHOD OF IMAGE PROCESSING FOR SELECTIVE COLOR DETERMINATION

CROSS-REFERENCE TO RELATED APPLICATIONS

This patent application is based on and claims priority under 35 U.S.C. §119 to Japanese Patent Application No. 2008-119963, filed on May 1, 2008, in the Japanese Patent Office, the disclosure of which is hereby incorporated herein by reference.

FIELD OF THE INVENTION

The present invention generally relates to an apparatus and method of image processing, and more specifically to an apparatus and method of determining whether input image data is color or monochrome to generate a determination result, and applying image processing determined based on the determination result to the input image data.

BACKGROUND

The recent image processing apparatuses may be provided with the function of determining whether input image data is color or monochrome to generate a determination result, and applies image processing that is determined based on the determination result to the input image data, for example, as described in the Japanese Patent Application Publication Nos. 2007-116272, 2001-103324, 2007-028408, 2006-086629, and the Japanese Patent No. 3772610.

In one example, the image processing apparatus pre-scans the original document to determine whether the original document is color or monochrome to generate a determination result. Based on the determination result, the image processing apparatus scans the original document to generate input image data, and applies image processing determined based on the determination result to the input image data.

Since the original document is being scanned twice, the processing speed decreases by half, resulting the slower processing speed. Further, when the original document includes a plurality of pages, the determination result may not be correctly obtained for each page especially when the page of the original document is not correctly transferred to the image reading section by error.

In another example, the image processing apparatus may perform image processing to the input image data, without pre-scanning the original document. At the same time, the image processing apparatus determines whether the input image data is monochrome or color to generate a determination result. In such case, the image processing apparatus applies image processing such that the resultant image data may be used for monochrome and color, since the determination result is not ready at the time of applying image processing. For example, assuming that the processed image data is in CMYK, when the determination result indicates that the image data is to be output as monochrome, the image processing apparatus outputs the K image data. When the determination result indicates that the image data is to be output as color, the image processing apparatus outputs the CMYK image data. However, since the image processing that is applied to the image data is not determined based on the determination result indicating whether the image data is to be output as color or monochrome, the image quality of the printed image may not be sufficiently high.

Further, when the image data is applied with the image processing common for monochrome and color, the image processing apparatus may not be able to send the image data, for example, to an external device such as a personal computer that requires the RGB image data. In such case, the image processing apparatus generates a plurality of kinds of image data including the CMYK image data and the RGB image data. This may be cumbersome and requires a large amount of memory, especially when the image processing apparatus has a variety of applications.

One possible solution to the above-described problem is to store the image data in a predetermined format such as a format specific to the image processing apparatus. When the user instruction for outputting the image data is received, the image processing apparatus interprets the user instruction to determine a data format that meets the intended use of the image data.

While the above-described solution may be effective in terms of not requiring the image processing apparatus to have a large amount of memory space, the processing time that is required for interpreting and applying image processing based on the interpretation may increase. Further, when a data area subjected for output is different from a data area subjected for input, image processing determined based on the determination result which is generated at the time of inputting image data may not reflect the characteristics of the data area of the image data for output.

SUMMARY

Example embodiments of the present invention include an image processing apparatus including a first color determining device to obtain input image data and to determine whether a first area of the input image data is color image or monochrome image to generate a first determination result; a storage device to store the input image data and the first determination result; a controller to obtain a user instruction for outputting a second area of the input image data as output image data, to compare between the first area of the input image data and the second area of the input image data to generate a comparison result; a second color determining device to obtain the input image data read from the storage device and to determine whether the second area of the input image data is monochrome image or color image to generate a second determination result, when the comparison result indicates that the second area of the input image data does not match the first area of the input image data; and an output image processing device to read the input image data from the storage device, and to apply image processing to at least the second area of the input image data. When the comparison result indicates that the second area of the input image data does not match the first area of the input image data, the controller causes the second color determining device to generate the second determination result and causes the output image data to be generated based on the second determination result. When the comparison result indicates that the second area of the input image data matches the first area of the input image data, the controller causes the output image processing device to apply image processing determined based on the first determination result to the input image data to generate the output image data based on the first determination result.

Example embodiments of the present invention include an image processing method including: obtaining input image data; determining whether a first area of the input image data is color image or monochrome image to generate a first determination result; storing the input image data and the first determination result in a storage device; obtaining a user instruction for outputting a second area of the input image data as output image data; comparing between the first area of the input image data and the second area of the input image data to generate a comparison result; determining whether the second area of the input image data read from the storage device is monochrome image or color image to generate a second determination result and generating the output image data based on the second determination result, when the comparison result indicates that the second area of the input image data does not match the first area of the input image data; and applying image processing determined based on the first determination result to the input image data read from the storage device to generate the output image data based on the first determination result, when the comparison result indicates that the second area of the input image data matches the first area of the input image data.

In addition to the above-described example embodiments, the present invention may be practiced in various other ways, for example, as an image processing system including the above-described image processing apparatus, or a storage medium storing a plurality of instructions which cause a computer to perform the above-described image processing operation.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
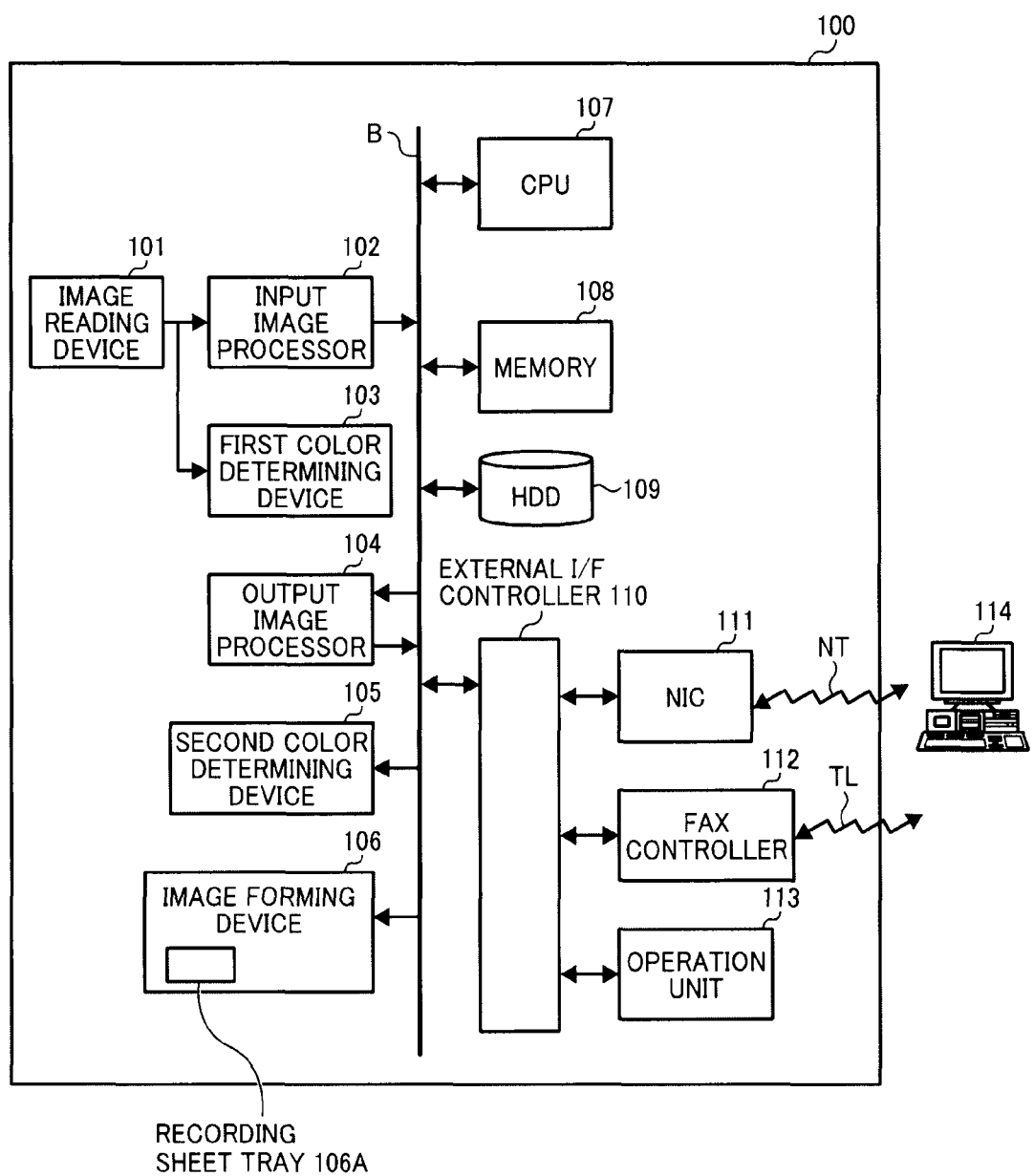
FIG. 1 is a schematic block diagram illustrating a structure of an image processing apparatus, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 1, a structure of a digital copier 100 is explained according to an example embodiment of the present invention. In this example, the digital copier 100 is implemented by a multifunctional apparatus (MFP) capable of providing a plurality of functions. For the illustrative purpose, the digital copier 100 may be referred to as the MFP 100.

Referring to FIG. 1, the MFP 100 includes an image reading device 101, an input image processor 102, a first color determining device 103, an output image processor 104, a second color determining device 105, an image forming device 106, a central processing unit (CPU) 107, a memory 108, a hard disk drive (HDD) 109, and an external interface (I/F) controller 110, which are connected and communicable via an extended bus B. The MFP 100 further includes a network interface circuit (NIC) 111, a facsimile (fax) controller 112, and an operation unit 113, which are respectively connected to the external I/F controller 110.

The CPU 107 provides the function of controlling operation of the MFP 100. The CPU 107 may be implemented by any processor, which is provided with a memory such as a random access memory (RAM) or a read only memory (ROM).

The external I/F controller 110 may be implemented by any desired interface, which allows the MFP 100 to communicate with an outside apparatus such as a personal computer (PC) 114 using the network function or the facsimile function.

To the external I/F controller 110, the NIC 111 capable of allowing the MFP 100 to perform network communication via a network NT, the fax controller 112 capable of allowing the MFP 100 to perform facsimile communication via a public switched telephone network TL, and the operation unit 113 capable of allowing the MFP 100 to communicate with a user are respectively connected. The operation unit 113 may be implemented by, for example, a touch panel screen capable of displaying information to the user while allowing the user to input a user instruction.

The image reading device 101, which provides the function of reading image data, may be implemented by a scanner capable of reading an original document into input image data. The image reading device 100 mainly includes a line sensor such as a charged coupled device (CCD) photoelectric converter, an analog/digital (A/D) converter, and a drive circuit that drives such as the line sensor or the A/D converter. In example operation, the image reading device 101 scans an original document, which may be placed onto an exposure glass of the MFP 100 or sent to an image reading device of the MFP 100 such as by a document feeder, into digital image data using the liner sensor. The digital image data may be generated as RGB image data having continuous tone information of the original document, including 8-bit red (R) image data, 8-bit green (G) image data, and 8-bit blue (B) image data. The image reading device 101 may further apply shading correction to the image data output from the linear sensor so as to eliminate the variations caused due to the sensitivity of the linear sensor, before outputting the image data to the input image processor 102 and the first color determining device 103.

Figure 2:
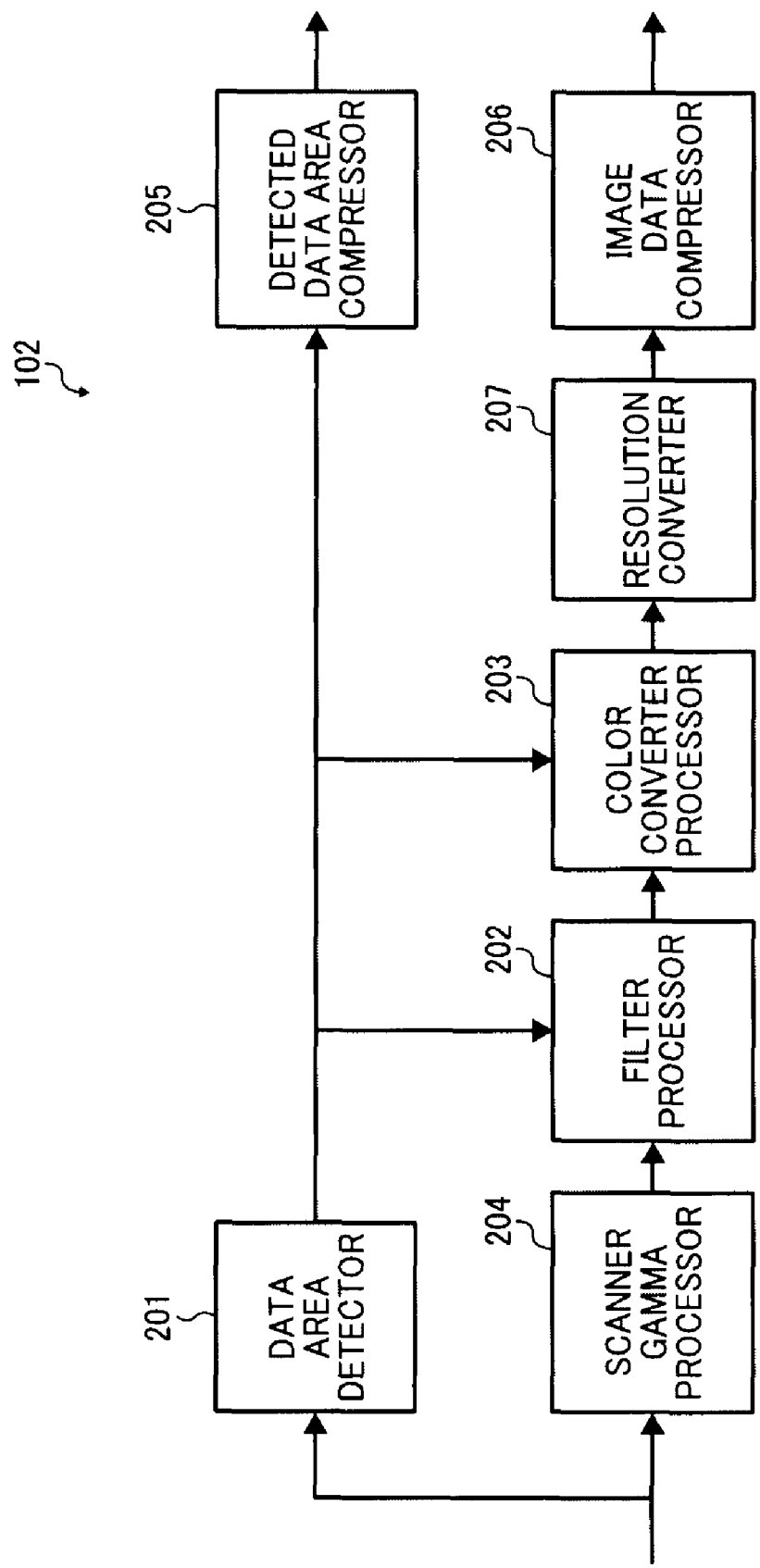
FIG. 2 is a schematic block diagram illustrating a structure of an input image processor of the image processing apparatus of FIG. 1.

The input image processor 102 applies various image processing to the image data output by the image reading device 101. FIG. 2 illustrates an example structure of the input image processor 102. The input image processor 102 includes a data area detector 201, a detected data area compressor 205, a scanner gamma processor 204, a filter processor 202, a color converter processor 203, a resolution converter 207, and an image data compressor 206.

The data area detector 201 receives the image data obtained by the image reading device 101, and detects, segments, or extracts a specific area from the image data received from the image reading device 101. For example, the specific area may be a halftone section that simulates the continuous tone of the image data, or an edge section of a character detected in the image data. In another example, the data area detector 201 may detect a chromatic section or an achromatic section of the image data. In another example, the data area detector 201 may detect a background section of the image data having a background color such as white.

The scanner gamma processor 204 receives the image data obtained by the image reading device 101, and applies gamma conversion to the image data such that the characteristics specific to the image reading device 101 is converted to the characteristics specific to an output device such as the image forming device 106 or any other output device connected to the MFP 100. For example, when the image data is to be output through the image forming device 106, the scanner gamma processor 204 applies gamma conversion to the image data, which is a color signal, such that the achromatic characteristics of the image data is converted to the spatial characteristics of the output device. Alternatively, the scanner gamma processor 204 may apply gamma conversion to the image data such that the image data has characteristics specific to the memory 108 or the HDD 109 which will store the processed image data. The processed image data is output to the filter processor 202.

The filter processor 202 converts spatial frequency of the image data such that the resultant image data has characteristics specific to the desired memory of the MFP 100 or the output device such as the image forming device 106. Further, the filter processor 202 may apply specific filtering processing to a section of the image data that corresponds to the detected area detected by the data area detector 201. For example, when the halftone section is detected, the filter processor 202 applies smoothing processing to the detected halftone section. In another example, when the edge section is detected in the background section having a background color, the filter processor 202 applies edge enhancement processing to the detected edge section to optimize the modulation transfer function (MTF) characteristics, assuming that the detected edge section corresponds to the character in the image data. The processed image data is sent to the color converter processor 203.

The color converter processor 203 applies color space conversion to the image data received from the filter processor 202. In this example, the color converter processor 203 applies color space conversion to the image data such that the resultant image data has a device specific color space, which is previously determined. Alternatively, the color converter processor 203 may apply color space conversion so as to generate the image data in RGB color space, which is widely used. Further, in this example, the color converter processor 203 may apply color space conversion using any known technique. The processed image data is output to the resolution converter 207.

The resolution converter 207 may apply resolution conversion to the image data as needed to generate the image data having a desired resolution, for example, using the three dimensional convolution method. When the resolution of the input image data and the resolution of the image data to be output is the same, the resolution converter 207 does not apply resolution conversion.

The image data compressor 206 compresses the processed image, which is received from the resolution converter 207, using a lossy compression method such as JPEG compression method.

The detected data area compressor 205 compresses the data area, or the data section, which is detected and segmented by the data area detector 201, using a lossless compression method such as MMR compression method. The lossless compression method is preferably used so as to retain pixel information of the detected data area even after image processing is applied to the detected data area.

Referring back to FIG. 1, the image data output from the input image processor 102, such as the compressed image data output from the image data compressor 206 and the compressed data area output from the detected data area compressor 205, may be stored in a desired memory such as the memory 108 or the HDD 109. In this example, the memory 108, which may be implemented by a random access memory (RAM) or nonvolatile RAM, stores the image data at least temporarily. The HDD 109, capable of storing a large amount of data, stores the image data preferably for later use.

While the image data is being read by the image reading device 101, the read image data may be sequentially sent to the image forming device 106, for example, when the memory space of the MFP 100 such as the memory 108 is sufficient enough. Alternatively, when the memory space is limited, for example, in order to reduce the overall manufacturing cost of the MFP 100, the image data read by the image reading device 101 is stored in the memory 108 or the HDD 109 at least temporarily.

Figure 3:
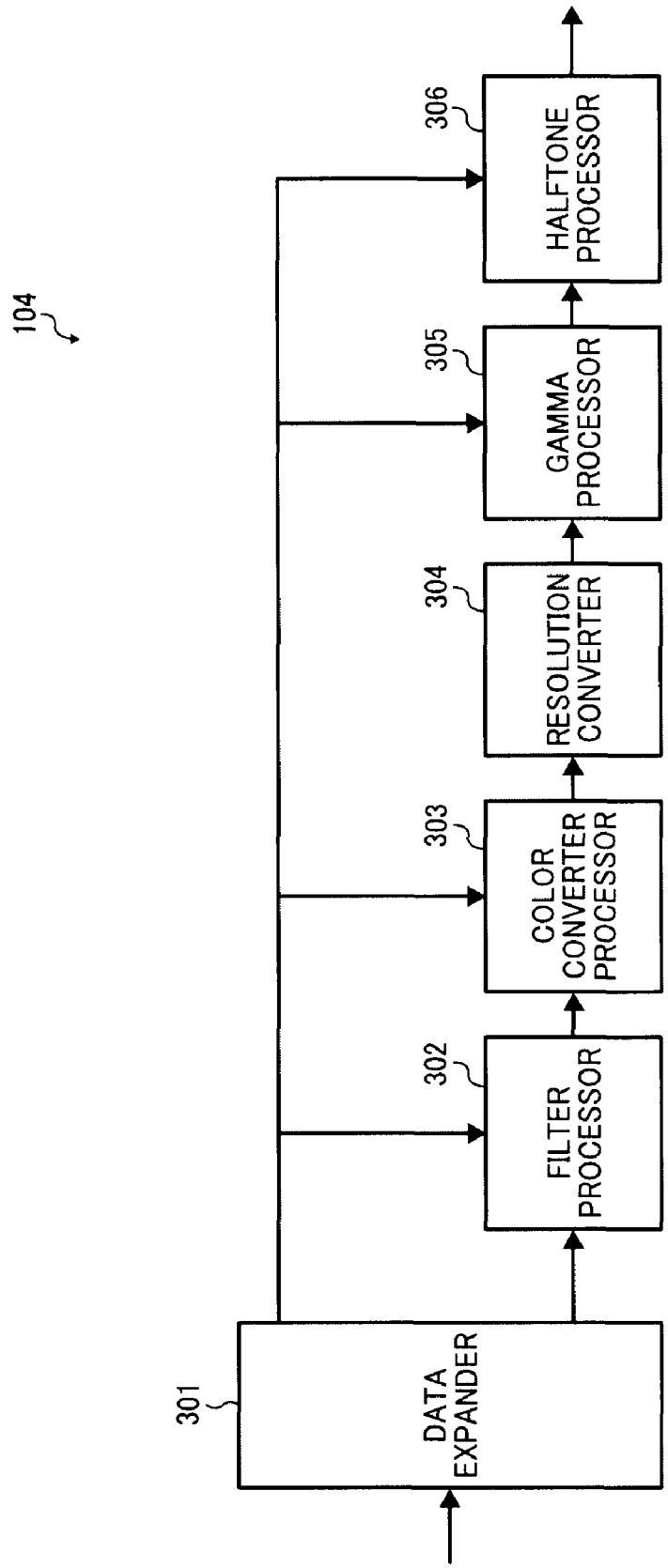
FIG. 3 is a schematic block diagram illustrating a structure of an output image processor of the image processing apparatus of FIG. 1.

The image data being stored in the memory 108 or the HDD 109 may be sent to the output image processor 104 via the extended bus B. The output image processor 104 applies various image processing to the image data read from the memory 108 or the HDD 109 such that the characteristics of the image data is converted to the characteristics specific to the output device such as the image forming device 106 or any output device connected to the MFP 100. For example, when the output device is the image forming device 106, the output image processor 104 converts the image data from RGB color space to CMYK color space. FIG. 3 illustrates an example structure of the output image processor 104.

Referring to FIG. 3, the output image processor 104 includes a data expander 301, a filter processor 302, a color converter processor 303, a resolution converter 304, a gamma processor 305, and a halftone processor 306.

The data expander 301 obtains the image data including the compressed image data and the compressed data area from the memory 108 or the HDD 109 via the extended bus B, and expands the obtained image data. In this example, the expanded image data and the expanded data area are made in correspondence with each other for each pixel.

The filter processor 302 applies filtering processing to the expanded image data and the expanded data area such that the resultant processed data has the MTF characteristics specific to the output device such as the image forming device 106. Referring back to FIG. 2, in one example, the filtering processing applied by the filter processor 202 is determined such that the processed image data has characteristics specific to the memory 108 or the HDD 109. In such case, the filter processor 302 converts the image data from the characteristics specific to the memory 108 or the HDD 109, to the characteristics specific to the output device such as the image forming device 106. Further, in a substantially similar manner as described above referring to FIG. 2, the filter processor 302 may apply specific filtering processing to a section of the image data that corresponds to the detected area detected by the data area detector 201.

The color converter processor 303 applies color space conversion to the image data received from the filter processor 302. For example, when the data area detected by the data area detector 201 indicates an achromatic section, the color converter processor 303 may convert the image data from RGB to K when applying RGB to CMYK conversion, assuming that the detected section corresponds to the character in black color.

The resolution converter 304 may apply resolution conversion to the image data as needed to generate the image data having a desired resolution, in a substantially similar manner as described above referring to the resolution converter 207 of FIG. 2.

The gamma processor 305 receives the image data from the resolution converter 304, and applies gamma conversion to the image data such that the characteristics specific to the memory 108 or the HDD 109 is converted to the characteristics specific to the output device such as the image forming device 106.

The halftone processor 306 applies halftone processing to the image data received from the gamma processor 305 such that the processed image data has the characteristics specific to the output device such as the image forming device 106. In this example, halftone processing includes, for example, dither processing or error dispersion processing. Further, the halftone processor 306 may apply conversion on the image data as needed such that the bit depth of the halftone image data matches the output device. For example, when the image forming device 106 is designed to output the halftone image data of 1 bit, the halftone processor 306 may convert the image data from 8 bit to one bit, while performing dither processing.

The image data output from the output image processor 104 is stored in a desired memory such as the memory 108 or the HDD 109. When an instruction for forming an image is received from the CPU 107, the image forming device 106 obtains the image data, which is stored in CMYK, from the memory 108 or the HDD 109 via the extended bus B, and outputs a printed image onto a recording sheet, for example, using the electrophotographic printing method. In this example, the image forming device 106 may be implemented by a plurality of image forming devices capable of together forming a toner image onto a recording sheet. The plurality of image forming devices include, for example, an exposure device, charge device, photoconductor, developing device, cleaning device, sheet transfer device, sheet storage device, etc.

Referring back to FIG. 1, the image data output from the image reading device 101 is also input to the first color determining device 103. The first color determining device 103 determines whether a predetermined data area of the input image data, which is input from the image reading device 101, is color image or monochrome image to generate a first determination result, for example, using any known technique. For example, from the data area of the input image data, color information for each pixel may be obtained. Using the color information, the first color determining device 103 may determine whether the data area of the image data contains only achromatic pixels. When it is determined that the data area of the image data contains only achromatic pixels, the first color determining device 103 determines that the image data is monochrome. When it is determined that the data area of the image data contains chromatic pixels, the first color determining device 103 determines that the image data is color. In this example, the first determination result may include information regarding the data area of the input image data subjected for determination by the first color determining device 103, and information regarding whether the data area is color or monochrome.

The first determination result may be stored in the desired memory such as the memory 108 or the HDD 109, preferably at the time of storing the image data obtained by the input image processor 102. Further, in this example, the first determination result is stored in the form of property data or metadata such as bibliographic information of the image data.

In this example, the first determination result may be used to determine specific image processing to be applied by the output image processor 104 at the time of generating the image data having the characteristics specific to the output device. For example, the MFP 100 may be previously programmed such that the output image data is applied with specific image processing, which is determined based on the first determination result indicating whether the input image data is color or monochrome. Alternatively, the MFP 100 may be previously programmed such that the MFP 100 only functions as above when a user instruction, which may be received from the operation unit 113, instructs the MFP 100 to use the first determination result for determining processing to be applied.

For example, when the first determination result indicates that the input image data obtained by the image reading device 101 is color image, the output image processor 104 applies image processing specific to the color image such that the processed image data has the characteristics specific to the color image.

Alternatively, when the first determination result indicates that the input image data obtained by the image reading device 101 is monochrome image, the output image processor 104 applies image processing specific to the monochrome image such that the processed image has the characteristics specific to the monochrome image, for example, by converting the RGB image data to the K image data. As described above referring to FIG. 3, conversion from RGB to K is performed by the color converter processor 303. In addition to the color conversion, any other devices in the output image processor 104 may apply desired processing using a specific parameter designed for monochrome image. In this manner, even when the image data is input in color and output in monochrome, the image quality of the output image data is maintained at high quality.

Especially when the MFP 100 is provided with a charging device, which charges the higher fee for the color image, correctly determining whether the image data for output is color or monochrome without reducing the overall speed is important.

Alternatively, the MFP 100 may be instructed to perform image processing without determining specific image processing to be performed based on the first determination result. In such case, the user may input a user instruction for specifying whether the image data is to be output in color or monochrome. Based on the user instruction, the MFP 100 determines specific image processing to be performed, and applies the specific image processing before outputting the image data in the desired format specified by the user.

Further, in any one of the above-described operation, the data input or output may be controlled by the CPU 107. As described above, the image data may be exchanged among the image reading device 101, the input image processor 102, the output image processor 104, and the image forming device 106, via the extended bus B. In one example, when the image data processed by the output image processor 104 is ready for output to the image forming device 106, the image forming device 106 may not be able to form an image depending on the status of an engine plotter provided in the image forming device 106. In such case, the CPU 107 causes the image data processed by the output image processor 104 to be stored in the memory 108 or the HDD 109 at least temporarily, until when the image forming device 106 becomes ready for print output. In another example, when the image data read by the line scanner of the image reading device 101 is to be transferred to the output image processor 104, the output image processor 104 may not be able to process the image data when other processing is performed on other image data. In such case, the CPU 107 instructs the image data processed by the image processor 104 to be stored in the memory 108 or the HDD 109 at least temporarily, until when the output image processor 104 becomes ready for image processing.

In this manner, the CPU 107 has the function of controlling the input or output of a data signal or image data among a plurality of modules that share the extended bus B.

With the above-described function of controlling the input or output of image data, a plurality of functions may be performed concurrently by the MFP 100. For example, referring to FIG. 1, operation of reading a first original document into first image data performed by the image reading device 101 and operation of outputting second image data previously stored in the desired memory onto a printed sheet performed by the image forming device 106 may be performed concurrently. Additionally, operation of outputting the first image data stored in the desired memory via the fax controller 112 as facsimile data may be performed concurrently with the above-described operation of reading and outputting.

More specifically, the image reading device 101 reads the first original document into first image data, and sends the first image data respectively to the input image processor 102 and the first color determining device 103. The input image processor 102 applies image processing to the first image data, and stores the processed first image data in the memory 108 or the HDD 109. The first color determining device 103 determines whether the first image data is color image or monochrome image to generate a first determination result, and stores the first determination result in the memory 108 or the HDD 109. Concurrently, the output image processor 104 may read out second image data from the memory 108 or the HDD 109, apply image processing to the second image data, and output the processed second image data to the image forming device 106.

When performing operation of reading the first original document and operation of outputting the second image data are performed concurrently, the image reading device 101 and the image forming device 106 tend to require more processing time when compared to the output image processor 104. This is partly because the reading or printing operation requires the time for transferring an original document or a recording sheet, while the image processing only requires computation by a controller.

Figure 6:
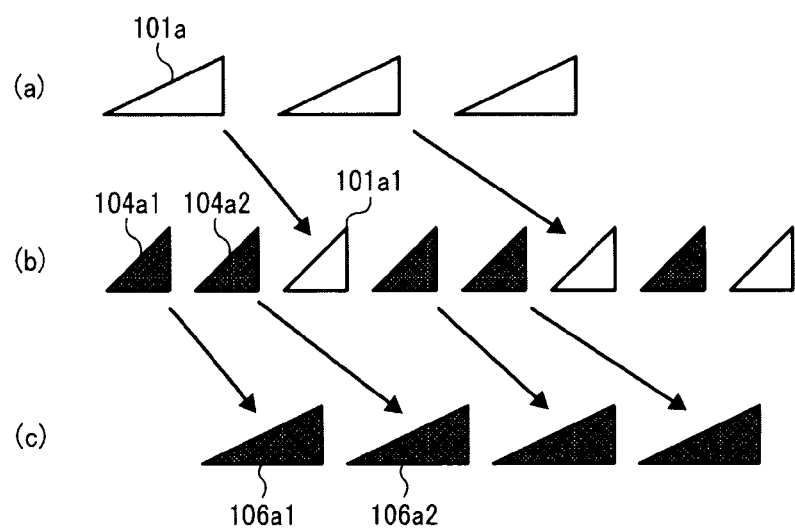
FIG. 6 is an illustration for explaining operation of controlling image processing, performed by a central processing unit of the image processing apparatus of FIG. 1, according to an example embodiment of the present invention.

Referring to FIG. 6, operation of concurrently performing a plurality of operations, performed by the MFP 100, is explained according to an example embodiment of the present invention. FIG. 6(a) illustrates operation of reading an original document performed by the image reading device 101. FIG. 6(b) illustrates operation of applying image processing performed by the input image processor 104. FIG. 6(c) illustrates operation of forming the image data performed by the image forming device 106.

Referring to FIG. 6(a), the image reading device 101 reads an original document 101a into image data. At substantially the same time, the output image processor 104 converts the image data 101a to image data 101a1. Concurrently, the image processor 104 reads out image data 104a1 and 104a2, which is to be output, from the memory 108 or the HDD 109, and transfers the read image data 104a1 and 104a2 to the image forming device 106. As described above, the processing time required by the output image processor 104 to process one unit data tends to be less than the processing time required by the image reading device 101 to process one unit data. In this example illustrated in FIG. 6, the image processor 104 processes two pieces of data including the image data 104a1 and the image data 104a2 subjected for output to the image forming device 106, while processing one piece of data including the image data 101a1 being input.

As described above, the processing time required by the output image processor 104 to process one unit data tends to be less than the processing time required by the image forming device 106 to process one unit data. While waiting for the image forming device 106 to process the image data 106a1 and the image data 106a2, the image processor 104 may process the image data 101a1 to generate fax image data. The fax image data may be stored in the memory 108 or the HDD 109. When all fax image data for the original document is stored, the fax image data is sent by the fax controller 112 through the external I/F controller 110. As described above referring to FIG. 6, the CPU 107 controls processing to be performed by each device such that a plurality of functions may be performed by the MFP 100.

In alternative to sending the image data being input as facsimile data, or in parallel to sending the image data being input as facsimile data, the input image data may be stored in the memory 108 or the HDD 109. In such case, the image data may be stored in a format such that it is not device-specific. By storing the image data in such format that is not device-specific, the image data may be sent to any desired output device upon receiving a user instruction.

More specifically, the image reading device 101 may read the original document into image data, and send the image data respectively to the input image processor 102 and the first color determining device 103. The input image processor 102 may apply image processing to the image data such that the processed image data has a format that is not device-specific. For example, the image data may be generated in any widely used color space such as sYCC, Adobe RGB, or any desired type of RGB. The image data may be generated to have a spatial frequency that is widely used. The processed image data is transferred to the HDD 109 via the extended bus B.

The first color determining device 103 determines whether the input image data is color or monochrome, and stores a first determination result in the HDD 109, for example, as property data that corresponds to the input image data. Since the first determination result is stored, the user may select whether to perform image processing determined based on the first determination result to the image data when outputting the image data at any time.

When the user selects to use the first determination result to determine image processing to be applied to the image data, the output image processor 104 reads out the image data from the memory 108 or the HDD 109 via the extended bus B. For example, when the first determination result indicates that the input image data is color image, the output image processor 104 may apply image processing to the input image data to generate the image data in color. In another example, when first determination result indicates that the input image data is monochrome image, the output image processor 104 may apply image processing to the input image data to generate the image data in monochrome. Further, the output image processor 104 may apply image processing such that the processed image data has characteristics specific to the output device such as the image forming device 106 or any output device. The processed image data is stored in the memory 108 and transferred to the output device such as the image forming device 106 for output.

As described above, when the user instructs the MFP 100 to perform image processing determined based on the first determination result to output the image data in color or monochrome, the MFP 100 assumes that the data area of the input image data subjected for determination by the first color determining device 101 matches the data area of the image data to be output, for example, by the image forming device 106. However, the user may sometimes instruct the MFP 100 to print a specific section of the input image data, which is different from the data area subjected for determination by the first color determining device 101.

Figure 5:
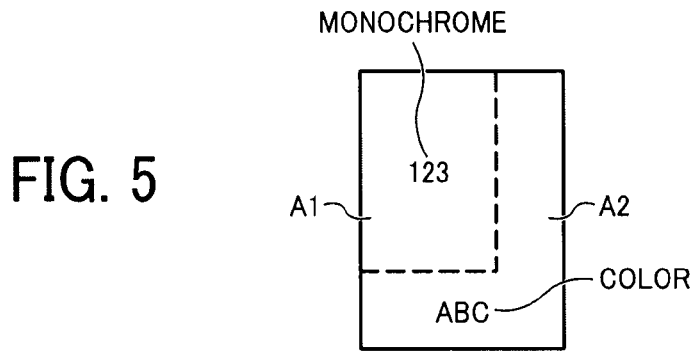
FIG. 5 is an illustration for explaining a first data area of input image data and a second data area of input image data, according to an example embodiment of the present invention.

For example, the user may instruct the MFP 100 to output a data area of the input image data, which is smaller in size than the data area of the input image data subjected for determination by the first color determining device 103. For example, it is assumed that the image data of FIG. 5 is stored in the desired memory of the MFP 100. The image data of FIG. 5 includes character data "123" in monochrome, and character data "ABC" in color. Further, the first color determining device 103 determines whether a data area A2 of the input image data of FIG. 5 is color or monochrome to generate a first determination result. Since the data area A2 includes the color image, the first determination result indicates that the input image data is color image. When the user instruction requests the MFP 100 to print out a data area A1, which is smaller in size than the data area A2 of the input image data, the MFP 100 may not output the image data that accurately reflects the characteristics of the data area A1. Even when the data area A1 only includes the monochrome image, the output image processor 104 applies specific processing determined based on that the input image data is to be output in color image.

In view of the above, the CPU 107 is further provided with the function of comparing between a data area of the input image data subjected for determination by the first color determining device 103 (referred to as the "first data area") and a data area of the input image data for output (referred to as the "second data area") to generate a comparison result.

When the comparison result indicates that the second data area does not match the first data area, the CPU 107 causes the second color determining device 105 to determine whether the second data area is color image or monochrome image to generate a second determination result, and further causes the output image processor 104 to perform image processing determined based on the second determination result. In this example, the second color determining device 105 determines whether the second data area is color or monochrome in a substantially similar manner as the first color determining device 103.

When the comparison result indicates that the second data area matches the first data area, the CPU 107 causes the output image processor 104 to perform image processing determined based on the first determination result, without causing the second color determining device 105 to determine whether the second data area is color image or monochrome image.

Figure 4:
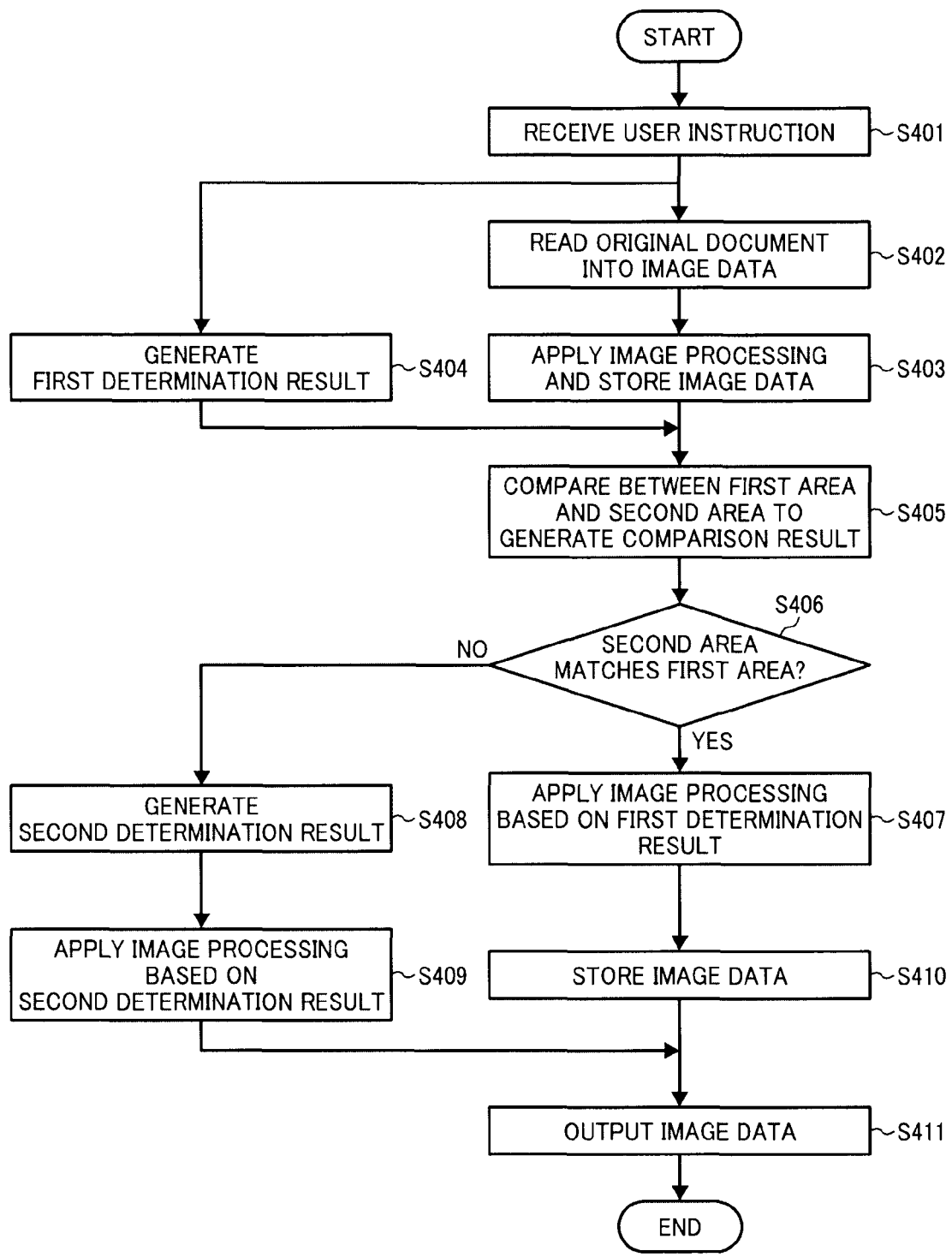
FIG. 4 is a flowchart illustrating operation of outputting image data, preformed by the image processing apparatus of FIG. 1, according to an example embodiment of the present invention.

Referring now to FIG. 4, operation of outputting image data, performed by the MFP 100 of FIG. 1, is explained according to an example embodiment of the present invention. The operation of FIG. 4 may be performed by the MFP 100 under control of the CPU 107.

At S401, the CPU 107 receives a user instruction for outputting image data. In this example, it is assumed that the CPU 107 receives a user instruction for copying a specified area of an original document through the operation unit 113.

At S402, the image reading device 101 reads the original document into image data, and sends the image data respectively to the first color determining device 103 and the input image processor 102.

At S403, the input image processor 102 applies image processing to the image data, and stores the processed image data in a desired memory such as the memory 108 or the HDD 109.

At S404, the first color determining device 105 determines whether a first data area of the image data is color image or monochrome image to generate a first determination result, and stores the first determination result into the desired memory. In this example, the first data area, which is the area subjected for determination by the first color determining device 103, is previously defined. Further, as described above referring to FIG. 1, the first determination result and the image data are stored in a corresponding manner. For example, the first determination result may be stored as property data of the image data.

At S405, the CPU 107 obtains information regarding the specific data area, which may be referred to as the second data area, subjected for printing from the user instruction received from the operation unit 113. The CPU 107 further obtains information regarding the first data area subjected for determination by the first color determining device 103. The CPU 107 then compares between the first data area and the second data area of the input image data to generate a comparison result.

At S406, the CPU 107 determines image processing to be applied by the output image processor 104 based on the comparison result generated at S405. More specifically, the CPU 107 determines whether the comparison result indicates that the second data area of the image data matches the first data area of the image data. When it is determined that the comparison result indicates that the second data area of the image data matches the first data area of the image data ("YES" at S406), the operation proceeds to S407. When it is determined that the comparison result indicates that the second data area of the image data does not match the first data area of the image data ("NO" at S406), the operation proceeds to S408.

At S407, the output image processor 104 obtains the image data from the memory such as the memory 108 or the HDD 109, and applies image processing, which is determined based on the first determination result, to the image data.

At S408, the CPU 107 causes the second color determining device 105 to generate a second determination result, by determining whether the second data area of the image data is color image or monochrome image. The second determination result may be stored in the desired memory, for example, in a corresponding manner with the image data.

At S409, the output image processor 104 obtains the image data from the memory such as the memory 108 or the HDD 109, and applies image processing, which is determined based on the second determination result, to the image data.

At S410, the output image processor 104 stores the processed image data to which the image processing is applied in the desired memory such as the memory 108 or the HDD 109.

At S411, the image forming device 106 reads out the image data from the desired memory, and forms a toner image of the second data area of the input image data on a recording sheet for output, and the operation ends. For example, when the user instructs to print the data area A1, the other portion of the image data is not printed.

As described above, when the first data area subjected for determination by the first color determining device 103 is different from the second data area subjected for output, the CPU 107 instructs the output image processor 104 to apply image processing, which is determined based on the second determination result. With this function, the output image processor 104 is able to apply image processing that is appropriate for the data area to be output, thus suppressing the degradation in output image quality even when the data area for output differs from the data area for color determination.

Further, when the first data area subjected for determination by the first color determining device 103 matches the second data area subjected for output, the CPU 107 instructs the output image processor 104 to apply image processing, which is determined based on the first determination result, without causing the second color determining device 105 to generate the second determination result. With this function, the second color determining device 105 operates only when needed, thus improving the overall processing speed. Further, the first determination result may be repeatedly used as long as it is usable.

Further, as illustrated in FIG. 1, the second color determining device 105 is provided separately from the first color determining device 103. With this structure, even when the first color determining device 103 is processing the image data being input to generate a first determination result, the second color determining device 105 is able to concurrently process the image data being stored to generate a second determination result. This increases the overall processing speed.

The operation of FIG. 4 may be performed by the CPU 107 according to an image processing program, which is installed onto any desired memory of the MFP 100 such as the memory 108 or the HDD 109. More specifically, upon execution, the CPU 107 may load the image processing program from the memory 108 or the HDD 109 onto the memory provided with the CPU 107. The image processing program includes a plurality of instructions which cause the CPU 107 to operate as described above referring to FIG. 4. Alternatively, any portion of the image processing program may be stored in any recording medium such as an optical disc. Alternatively, any portion of the image processing program may be provided via the network from any storage device.

The operation of FIG. 4 may be performed in various other ways. For example, the user may instruct the MFP 100 to output a second data area of image data, which is previously stored in the memory of the MFP 100. In such case, S402, S403, and S404 are performed at any time before S401.

In another example, the user may instruct the MFP 100 to output the image data to any device connected to the MFP 100, for example, the PC 114. In such case, the image data is preferably output in a format interpretable by the PC 114 such as in RGB when it is color. Alternatively, when the image data is to be output as facsimile data, image processing may be applied to the image data such that the image data is output in monochrome.

Further, in the above-described example of FIG. 5, it is assumed that the first data area of the input image data is smaller in size than the second data area of the input image data. However, the example described above may be performed when the second data area of the input image data is larger in size than the first data area of the input image data, or when the second data area of the input image data is located at different position from the position where the first data area of the input image data is located.

In the above-described example, the first data area of the input image data subjected for determination by the first color determining device 103 is preferably set so as to be slightly smaller in size than the sheet size of the original document to be input. This is because the edge portion of the scanned image data suffers from the noise partly due to the mechanical factors caused by the gap in thickness between the exposure glass surface of the image reading device 101 and the original document placed thereon especially when the original document is not tightly in contact with the exposure glass surface. When the noise is present in the edge portion, the edge portion having the background color such as white may be read as the portion having the color. In such case, even when the original document is monochrome, the first color determining device 103 may determine that the image data of the original document is color. In order to improve the accuracy in color determination, the first data area subjected for determination by the first color determining device 103 is previously set so as to be slightly smaller in size than the sheet size of the original document being read. Further, the sheet size of the original document is generally selected from any one of standard sheet sizes such as A4, A3, letter size, legal size, etc. For this reason, the first data area may be previously set so as to be smaller in size than a standard sheet size.

More specifically, in the above-described example of FIGS. 1 and 5, the image reading device 101 is capable of detecting the sheet size of the original document when scanning the original document, for example, using a sensor. Such information regarding the sheet size of the original document may be sent to the first color determining device 103, under control of the CPU 107, at the time of scanning. Based on the information regarding the sheet size of the original document, the first color determining device 103 may obtain information regarding the first data area that matches the sheet size, and determine whether the first data area of the input image data obtained by scanning is color or monochrome to generate a first determination result. The first determination result is stored in the memory in a corresponding manner with the input image data, such as in the form of property data of the input image data.

Still referring to FIGS. 1 and 5, the user instruction received by the operation unit 113 may include information regarding the second data area subjected for output, in terms of the sheet size of the recording sheet for output. For example, the user may select from a plurality of standard sheet sizes being displayed by the operation unit 113. In such case, the second color determining device 105 may set the second data area using information regarding the sheet size of the document for output.

In one example operation, when storing the first determination result, information regarding the sheet size of the original document may be stored in a corresponding manner with the first determination result and the input image data. For example, information regarding the sheet size of the original document may be stored as property data of the input image data. When the user instruction is received, which instructs the MFP 100 to output the image data onto a recording sheet having a sheet size selected by the user, information regarding the selected sheet size, which is the sheet size of the document for output, is sent to the CPU 107. Using information regarding the image data for output, the CPU 107 obtains information regarding the original sheet size of the image data from the memory. The CPU 107 compares between the original sheet size and the output sheet size to generate a comparison result. When the comparison result indicates that the output sheet size is smaller than the original sheet size, the CPU 107 causes the second color determining device 105 to determine whether the second data area, which is obtainable using the output sheet size, is color or monochrome to generate a second determination result. The CPU 107 further causes the output image processor 106 to apply image processing, which is determined based on the second determination result, to the image data obtained from the memory.

For example, when the original sheet size is A3, and the output sheet size is B4, the comparison result indicates that the output sheet size is smaller than the original sheet size. In such case, the second color determining device 105 determines whether the second data area that corresponds to the output sheet size is color or monochrome to generate the second determination result. The output image processor 104 applies image processing, which is determined based on the second determination result, to the image data to generate processed image data. The processed image data is output as a toner image formed on the B4 size sheet.

As described above, the first data area of the input image data may be determined based on a sheet size of an original document, which may be selected from a plurality of standard sheet sizes. Further, the second data area of the input image data may be determined based on a sheet size of an output document, which may be selected from a plurality of standard sheet sizes. In this manner, the comparison result may be generated based on the comparison between the original sheet size and the output sheet size, thus improving the processing speed for comparison.

In the above-described operation, the first data area subjected for determination by the first color determining device 103 is determined based on the actual sheet size of the original document, which may be the standard sheet size. Alternatively, the first data area may be determined based on any number of standard size sheets each having a specific standard sheet size and a specific orientation, in addition to determining a first data area based on the sheet size and/or orientation of the original document.

For example, as described above, the first color determining device 103 determines whether the first data area that corresponds to the original sheet size, which is detected from the original document, is color or monochrome to generate a first determination result for the original sheet size. When determining the first data area, the orientation of the original document is also considered as the first data area may differ depending on whether the original document has the portrait orientation or the landscape orientation. In addition, the first color determining device 103 may determine whether the first data area that corresponds to a standard size sheet having a standard size and an orientation is color or monochrome to generate a first determination result for the standard size sheet. In this manner, for one input image data, the first color determining device 103 may generate a plurality of first determination results each corresponding to one of a plurality of standard size sheet each having a standard sheet size and an orientation. The first determination results may be stored in a corresponding manner with the input image data.

Figure 7:
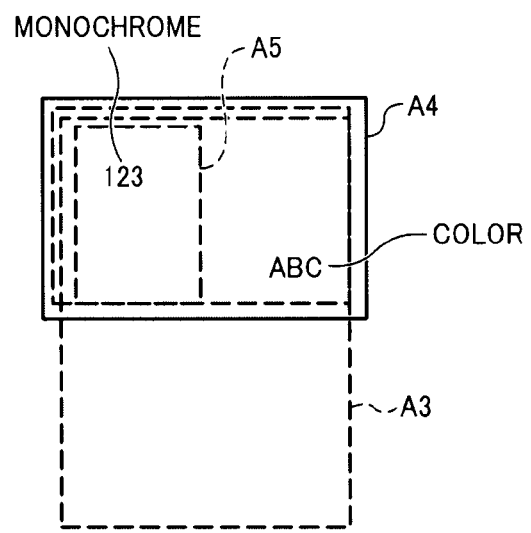
FIG. 7 is an illustration for explaining operation of determining a first data area subjected for determination by a first color determining device of the image processing apparatus of FIG. 1, according to an example embodiment of the present invention.

For example, as illustrated in FIG. 7, it is assumed that the original sheet size of the original document having the portrait orientation is A4. In such case, the first color determining device 103 determines whether the first data area that corresponds to the original sheet size of A4, portrait, is color or monochrome to generate a first determination result for the original sheet having the A4 sheet size and the portrait orientation. Subsequently, the first color determining device 103 selects a standard size sheet having a standard sheet size and a sheet orientation other than the original sheet size of A4, portrait, for further processing. For example, the first color determining device 103 selects the standard sheet size of A5, portrait, and determines whether the first data area that corresponds to the standard sheet size of A5, portrait, is color or monochrome to generate a first determination result for the standard size sheet having the A5 standard sheet size and the portrait orientation. Further, the first color determining device 103 selects the standard sheet size of A3, and determines whether the first data area that corresponds to the standard sheet size of A3 is color or monochrome to generate a first determination result for the standard size sheet having the A3 standard sheet size. Further, the first color determining device 103 selects the standard sheet size of A4, landscape, and determines whether the first data area that corresponds to the standard sheet size of A4, landscape, is color or monochrome to generate a first determination result for the standard size sheet having the A4 standard sheet size and the landscape orientation. The first determination results being obtained for the plurality of standard size sheets may be stored in the memory, for example, as property data of the input image data. Specifically, in this example, the memory stores:

information regarding the original sheet size and the original sheet orientation, which is A4, portrait;

information regarding whether the first data area corresponding to the original sheet size of A4, portrait, is color or monochrome (color in this example);

information regarding whether the first data area corresponding to the standard sheet size of A3 is color or monochrome (not detected in this example);

information regarding whether the first data area corresponding to the standard sheet size of A4, landscape, is color or monochrome (color in this example); and information regarding whether the first data area corresponding to the standard sheet size of A5, portrait, is color or monochrome (monochrome in this example).

As described above, the first color determining device 103 outputs "not detected" when image data is not contained in all sections of the data area.

At the time of outputting image data, the CPU 107 may generate a plurality of comparison results for each one of the plurality of first determination results being stored. In one example, when the user instructs the MFP 100 to output the image data onto the recording sheet having the A5 size, portrait, the CPU 107 compares between information regarding the sheet size and the orientation for output and information regarding the standard sheet size and the orientation, for each one of the standard size sheets available from the memory. In this example, since one comparison result indicates that the recording sheet having the A5 size, portrait, is the same as the standard sheet having the A5 size, portrait, the CPU 107 obtains the first determination result previously obtained for the standard sheet having the A5 size, portrait (monochrome in this example). The CPU 107 causes the output image processor 106 to apply image processing based on the obtained first determination result. Specifically, in this example, the output image processor 106 applies image processing appropriate for monochrome image data.

In another example, when the user instructs the MFP 100 to output the image data onto the recording sheet having the A3 size, the CPU 107 obtains the first determination result previously obtained for the standard sheet size of A3. In this example of FIG. 7, the first determination result indicates that no image data is detected. In such case, the CPU 107 does not have to instruct the second color determining device 105 to generate a second determination result as it determines that the recording sheet for output is larger in size than the original document sheet. In such case, the CPU 107 obtains the first determination result previously obtained for the original document size, and causes the output image processor 106 to apply image processing determined based on the obtained first determination result.

Further, in this example, a plurality of standard size sheets each used for determining a plurality of first data areas subjected for determination by the first color determining device 103 may be previously determined such that the standard size sheets each correspond to the standard size sheets printable by the MFP 100. For example, the MFP 100 is usually provided with a plurality of recording sheet trays 106A illustrated in FIG. 1 each tray corresponding to one of standard size sheets. Since information regarding the standard size sheets, including the sheet size and orientation, is obtainable from the memory, the CPU 107 may select the standard size sheets to be used for determining a data area for determination by the first color determining device 103 using information regarding the standard size sheets. For example, the MFP 100 may be provided with four recording sheet trays 106A respectively storing the A4 landscape paper, A4 portrait paper, A3 paper, and A4 landscape paper. In such case, the first data areas for determination by the first color determining device 103 may be determined so as to each correspond to the A4 landscape paper, A4 portrait paper, and A3 paper.

As described above, when a plurality of first determination results are stored each corresponding to a plurality of different first data areas, the chance of using the first determination result may increase, thus improving the processing speed while suppressing degradation in output image quality.

Especially, when the plurality of first data areas are determined so as to each correspond to the plurality of recording sheets available for use by the MFP 100, the chance of using the first determination result may increase, thus improving the processing speed while suppressing degradation in output image quality.

Figure 8:
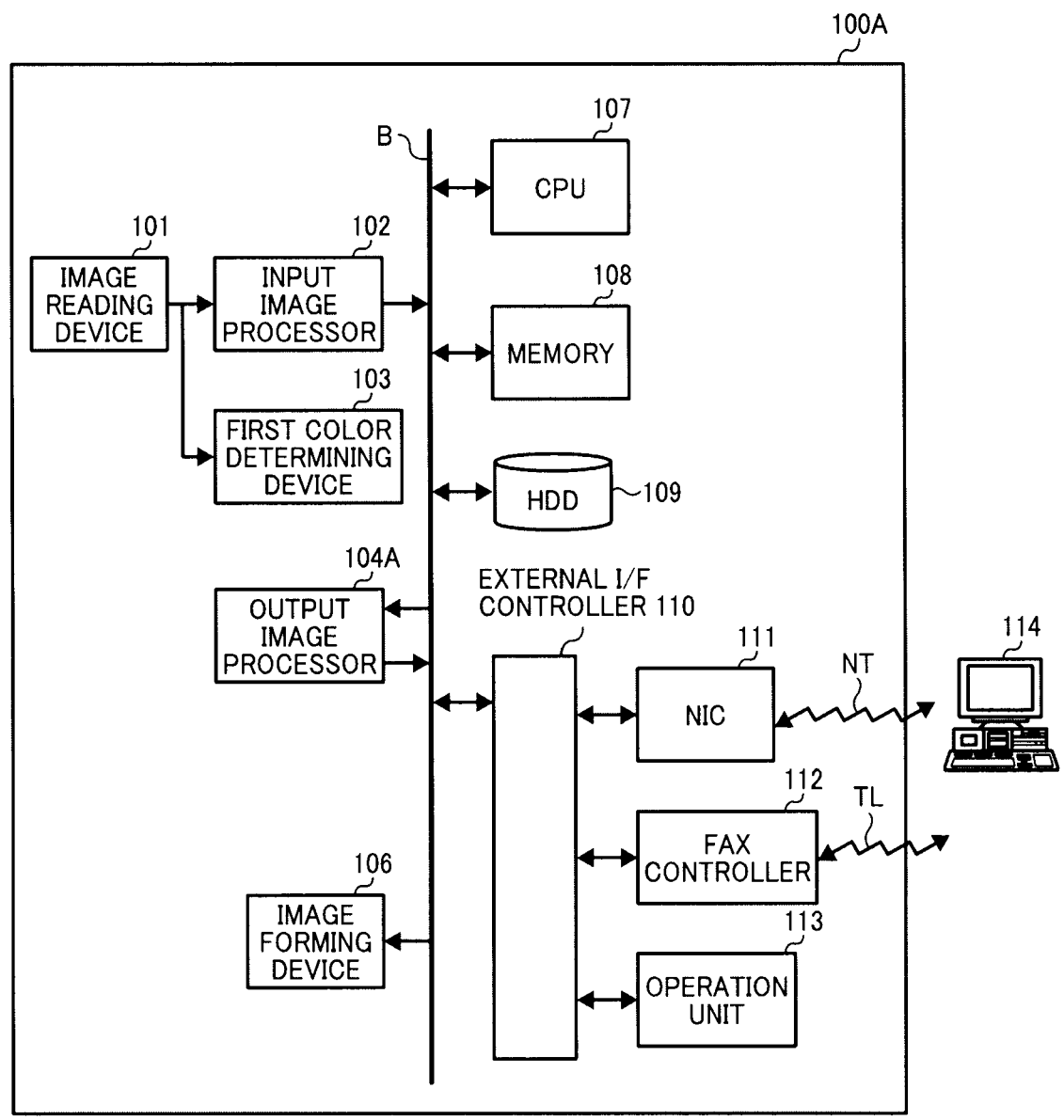
FIG. 8 is a schematic block diagram illustrating a structure of an image processing apparatus, according to an example embodiment of the present invention.

Referring now to FIG. 8, a structure of a digital copier 100A, which may be referred to as the MFP 100A, is explained according to an example embodiment of the present invention. The MFP 100A of FIG. 8 is substantially similar to the MFP 100 of FIG. 1. The differences include the replacement of the output image processor 104 with an output image processor 104A, and the second color determining device 105 is provided in the output image processor 104A as described in FIG. 9.

Figure 9:
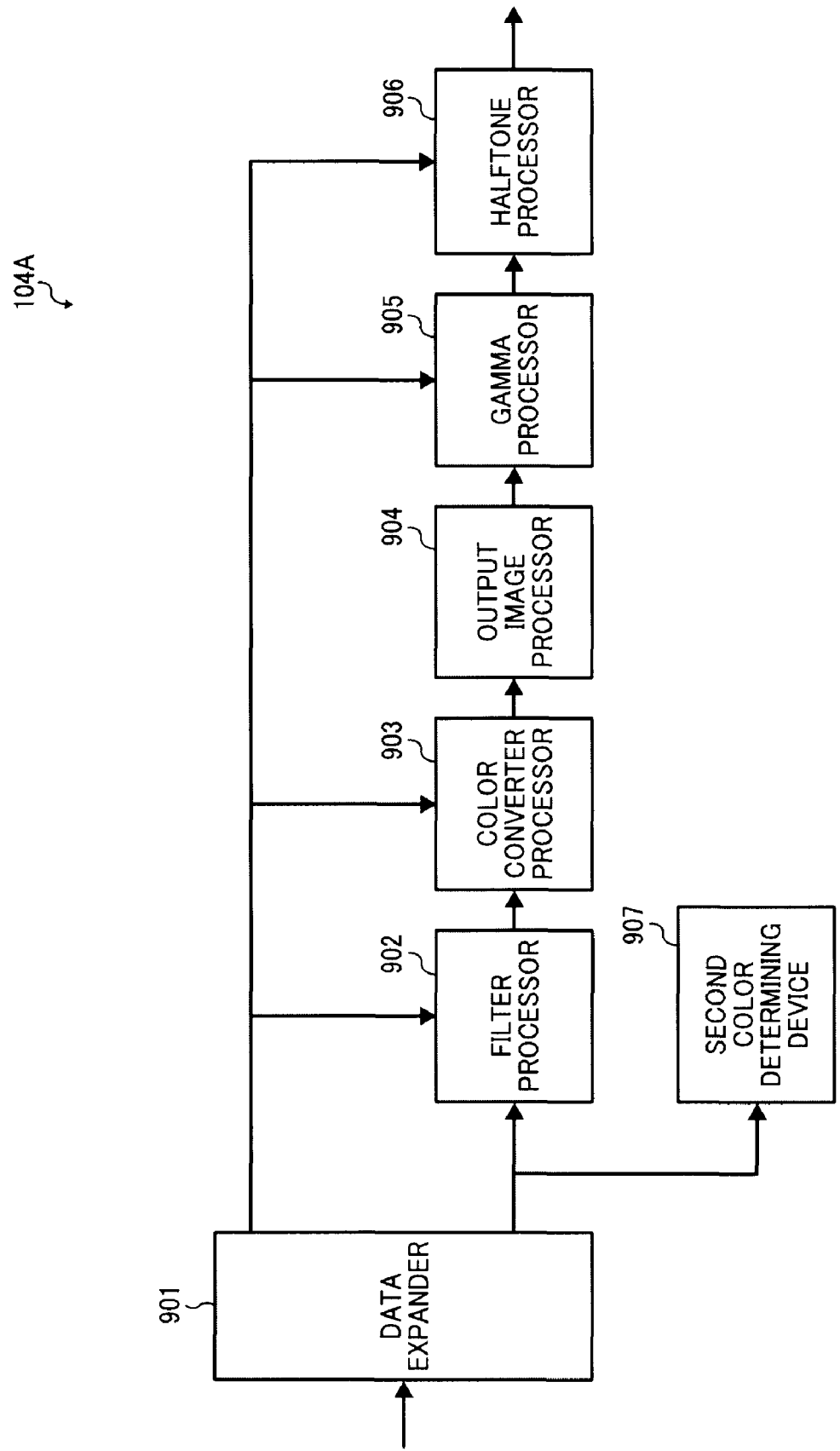
FIG. 9 is a schematic block diagram illustrating a structure of an output image processor of the image processing apparatus of FIG. 8.

As illustrated in FIG. 9, the output image processor 104A includes a data expander 901, a filter processor 902, a color converter processor 903, a resolution converter 904, a gamma processor 905, and a halftone processor 906, each of which operates in a substantially similar manner as the data expander 301, filter processor 302, color converter processor 303, resolution converter 304, gamma processor 305, and halftone processor 306 described above referring to FIG. 3. The output image processor 104A further includes a second color determining device 907, which operates in a substantially similar manner as the second color determining device 105 of FIG. 1.

The operations of inputting the image data, storing the first determination result and the input image data, and generating a comparison result, are performed in a substantially similar manner as described above referring to FIG. 1. The operation of outputting the image data, which is performed differently from the operation described above referring to FIG. 1, is described below.

In one example, the operation performed by the output image processor 104A is explained when it is determined that the second determination result is to be generated by the CPU 107 based on the comparison result.

The data expander 901 obtains the image data including the compressed image data and the compressed data area from the memory 108 or the HDD 109 via the extended bus B, and expands the obtained image data. The expanded image data is input respectively to the filter processor 902 and to the second color determining device 907.

The second color determining device 907 determines whether the second area of the obtained image data is color or monochrome to generate a second determination result. The second determination result is output to the CPU 107 via the extended bus B.

The image data input to the filter processor 902 may be processed subsequently by the color converter processor 903, the resolution converter 904, the gamma processor 905, and the halftone processor 906, in a substantially similar manner as described above referring to FIG. 3. However, in this example, the output image processor 104A applies image processing using a parameter that is common to color and monochrome such that the processed image data may be output as color image such as CMYK image or monochrome image such as K image. For example, the color converter processor 903 may apply image processing while decreasing the UCR rate to output the CMYK image, which may be stored in the memory 108 or the HDD 109. At the time of outputting the image data through the image forming device 106, the CPU 107 may select an image signal, or image data, for output to the image forming device 106 based on the comparison result. For example, when the second determination result indicates that the second data area of the input image data is monochrome, the CPU 107 causes the K image signal or the K image data to output to the image forming device 106 for output. When the second determination result indicates that the second data area of the input image data is color, the CPU 107 causes the CMYK image signal or the CMYK image data to output to the image forming device 106 for output.

In another example, the operation performed by the output image processor 104A is explained when it is determined that the first determination result is to be used by the CPU 107 based on the comparison result.

In such case, the CPU 107 causes the output image processor 104A to apply image processing determined based on the first determination result to the input image data. Specifically, the output image processor 104A operates in a substantially similar manner as the output image processor 104 of FIG. 3. In such case, the expanded image data is input to the second color determining device 907. However, since the output image processor 104A is in the process of applying image processing determined based on the first determination result, the second determination result does not have to be generated. For this reason, the CPU 107 may instruct the second color determining device 907 not to generate the second determination result. Alternatively, the second color determining device 907 may be designed such that it only generates the second color determining device 907 only when it receives the instruction from the CPU 107.

As described above referring to FIGS. 8 and 9, by providing the second color determining device 907 in the output image processor 104A, when the image data needs to be processed by the second color determining device 907 and the output image processor 104A, the number of transferring the image data via the extended bus B decreases.

Further, since the operation of generating the second determination result performed by the second color determining device 907 and the operation of applying image processing by the output image processor 104A may be concurrently performed, the overall processing speed may increase.

As described above, when the image data is to be output, the CPU 107 determines whether the second data area of the input image data matches the first data area of the input image data to generate a comparison result. When the comparison result indicates that the second data area of the input image data does not match the first data area of the input image data, the CPU 107 causes the second color determining device 907 to generate a second determination result while causing the output image processor 104A to apply image processing, which may be applied to the color image or the monochrome image. Based on the second determination result, the CPU 107 may select the format of the image data for output. In this manner, the processing speed increases.

Any one of the MFP 100 of FIG. 1 and the MFP 100A of FIG. 8 may be implemented in various other ways. For example, the operation unit 113 may be provided with the function of allowing the user to input priority information indicating whether the processing speed should be prioritized or the image quality should be prioritized.

For example, referring to FIG. 8, the operation unit 113 may be provided with a first key corresponding to a first mode and a second key corresponding to a second mode. When the first key is selected, the MFP 100A is switched to the first mode to output the image data with the increased processing speed. When the second key is selected, the MFP 100A is switched to the second mode to output the image data with the increased image quality.

For example, when the user selects the first key that corresponds to the first mode of processing with fast processing speed, the MFP 100A may operate in a substantially similar manner as described above referring to FIGS. 8 and 9, by concurrently performing the operation of generating the second determination result and the operation of applying image processing.

In another example, when the user selects the second key that corresponds to the second mode of processing with high image quality, the CPU 107 causes the output image processor 104A to obtain the image data from the memory 108 or the HDD 109. The compressed data area does not have to be provided to the output image processor 104A. At this time, the output image processor 104A does not perform any processing on the input image data, but waits for the second determination result. Specifically, the data expander 901 expands the image data, and outputs the expanded image data to the second color determining device 907. The second color determining device 907 determines whether the second data area, which is obtainable from the user instruction, of the input image data is color or monochrome to generate a second determination result. When the second determination result is output to the CPU 107, the CPU 107 instructs the output image processor 104A to obtain the input image data via the extended bus B, which includes the compressed image data and the compressed data area. The output image processor 104 applies image processing determined based on the second determination result to the input image data, and outputs the processed image data to the image forming device 106.

As described above, by providing the function of allowing the user to select from two modes, operability of the MFP 100A increases.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An image processing apparatus, comprising:
   a first color determining device configured to obtain input image data and to determine whether a first area of the input image data is color image or monochrome image to generate a first determination result;
   a storage device configured to store the input image data and the first determination result;
   a controller configured to obtain a user instruction for outputting a second area of the input image data as output image data, to compare between the first area of the input image data and the second area of the input image data to generate a comparison result;
   a second color determining device configured to obtain the input image data read from the storage device and to determine whether the second area of the input image data is monochrome image or color image to generate a second determination result, when the comparison result indicates that the second area of the input image data does not match the first area of the input image data; and
   an output image processing device configured to read the input image data from the storage device, and to apply image processing to at least the second area of the input image data, wherein:

when the comparison result indicates that the second area of the input image data does not match the first area of the input image data, the controller causes the second color determining device to generate the second determination result and causes the output image data to be generated based on the second determination result, and wherein:

when the comparison result indicates that the second area of the input image data matches the first area of the input image data, the controller causes the output image processing device to apply image processing determined based on the first determination result to the input image data to generate the output image data based on the first determination result.

2. The image processing apparatus of claim 1, wherein, when the comparison result indicates that the second area of the input image data does not match the first area of the input image data, the controller causes the output image processing device to apply image processing determined based on the second determination result to generate the output image data based on the second determination result.

3. The image processing apparatus of claim 1, wherein, when the comparison result indicates that the second area of the input image data does not match the first area of the input image data, the controller is configured to cause the output image processor to apply image processing that is common for color image and monochrome image to the input image data to generate processed image data concurrently with generation of the second determination result by the second color determining device, and to generate the output image data based on the second determination result using the processed image data.

4. The image processing apparatus of claim 1, further comprising:
an image reading device configured to read an original document into the input image data, wherein:
the controller is configured to obtain information regarding the original document including the size of the original document from the image reading device and to determine the first area of the input image data based on the information regarding the original document, and wherein:
the storage device is configured to store the information regarding the original document in a corresponding manner with the input image data and the first determination result.

5. The image processing apparatus of claim 4, wherein:
the controller is configured to obtain information regarding a recording sheet to which an image of the output image data is formed including the size of the recording sheet from the user instruction, and to determine the second area of the input image data based on the information regarding the recording sheet to which the image of the output image data is formed, and wherein:
the comparison result is generated based on whether the size of the recording sheet to which the image of the output image data is formed is smaller than the size of the original document.

6. The image processing apparatus of claim 5, wherein:
the first area of the input image data further includes, in addition to the first area of the input image data determined based on the original document, a first area of the input image data determined based on a standard size sheet having a standard sheet size and a specific orientation, wherein:
the controller is configured to generate the comparison result for the first area of the input image data determined based on the standard size sheet in addition to the comparison result for the first area of the input image data determined based on the original document.

7. The image processing apparatus of claim 6, further comprising:
an image forming device including a recording sheet storage device and configured to form the image of the output image data on the recording sheet, the recording sheet being stored in the recording sheet storage device, wherein:
the standard size sheet matches the recording sheet being stored in the recording sheet storage device.

8. The image processing apparatus of claim 5, wherein the first determination result and the information regarding the original document are stored as property data of the input image data.

9. The image processing apparatus of claim 4, further comprising:
an input image processing device configured to receive the input image data from the image reading device and to apply image processing to the input image data, wherein the input image data being stored is the input image data to which the image processing is applied by the input image processing device.

10. The image processing apparatus of claim 3, further comprising:
an operation unit configured to receive a user input which selects one of a first mode that prioritizes the processing speed of the image processing apparatus and a second mode that prioritizes the image quality of the output image data output from the image processing apparatus, wherein:
when the second mode is selected by the user input, the controller is configured to instruct the output image processing device to hold the operation of applying image processing until the second determination result is generated by the second color determining device, even when the comparison result indicates that the second area of the input image data does not match the first area of the input image data.

11. An image processing method, comprising:
obtaining input image data;
determining whether a first area of the input image data is color image or monochrome image to generate a first determination result;
storing the input image data and the first determination result in a storage device;
obtaining a user instruction for outputting a second area of the input image data as output image data;
comparing between the first area of the input image data and the second area of the input image data to generate a comparison result;
determining whether the second area of the input image data read from the storage device is monochrome image or color image to generate a second determination result, when the comparison result indicates that the second area of the input image data does not match the first area of the input image data;
generating the output image data based on the second determination result, when the comparison result indicates that the second area of the input image data does not match the first area of the input image data; and
applying image processing determined based on the first determination result to the input image data read from the storage device to generate the output image data based on the first determination result, when the comparison result indicates that the second area of the input image data matches the first area of the input image data.

12. The image processing method of claim 11, further comprising:

applying image processing determined based on the second determination result to generate the output image data based on the second determination result, when the comparison result indicates that the second area of the input image data does not match the first area of the input image data.

13. The image processing method of claim 11, further comprising:

applying image processing that is common for color and monochrome to the input image data concurrently with the generation of the second determination result, when the comparison result indicates that the second area of the input image data does not match the first area of the input image data.

14. The image processing method of claim 11, further comprising:

reading an original document into the input image data using an image reading device;

obtaining information regarding the original document including the size of the original document from the image reading device;

determining the first area of the input image data based on the information regarding the original document;

storing the information regarding the original document in a corresponding manner with the input image data and the first determination result;

obtaining information regarding a recording sheet to which an image of the output image data is formed including the size of the recording sheet from the user instruction;

determining the second area of the input image data based on the information regarding the recording sheet to which the image of the output image data is formed, wherein:

the comparison result is generated based on whether the size of the recording sheet to which the image of the output image data is formed is smaller than the size of the original document.

* * * * *